(12) United States Patent
Grüdl et al.

(10) Patent No.: US 10,189,388 B2
(45) Date of Patent: Jan. 29, 2019

(54) SECURED FOLD-OUT COMPONENT OR SECURED ARMREST

(71) Applicant: Adient Luxembourg Holding S.à.r.l., Luxembourg (LU)

(72) Inventors: Peter Grüdl, Jülich (DE); Ingo Kienke, Wermelskirchen (DE); Gerhard Rohtstein, Velbert (DE); Jörg Linnenbrink, Wuppertal (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 1 day.

(21) Appl. No.: 15/501,685

(22) PCT Filed: Aug. 5, 2015

(86) PCT No.: PCT/EP2015/068110
§ 371 (c)(1),
(2) Date: Feb. 3, 2017

(87) PCT Pub. No.: WO2016/020458
PCT Pub. Date: Feb. 11, 2016

(65) Prior Publication Data
US 2017/0217342 A1 Aug. 3, 2017

(30) Foreign Application Priority Data
Aug. 5, 2014 (DE) .................. 10 2014 215 432

(51) Int. Cl.
*B60N 2/75* (2018.01)
*B60N 2/42* (2006.01)

(52) U.S. Cl.
CPC ........... *B60N 2/753* (2018.02); *B60N 2/4221* (2013.01); *B60N 2/4249* (2013.01)

(58) Field of Classification Search
CPC ........ B60N 2/753; B60N 2/763; B60N 2/767; B60N 2/4249
USPC .............. 297/411.3, 411.32, 411.33, 411.35, 297/411.38
See application file for complete search history.

(56) References Cited

U.S. PATENT DOCUMENTS

| | | | | |
|---|---|---|---|---|
| 4,067,613 A | * | 1/1978 | Pesiri ................. | B60N 2/753 297/411.29 |
| 4,310,196 A | * | 1/1982 | Vogel ................. | B60N 2/242 297/411.32 |
| 4,579,384 A | * | 4/1986 | Sharod ............... | B60N 2/753 297/113 |
| 4,655,501 A | * | 4/1987 | Ishigami ............. | B60N 2/767 297/113 |
| 4,734,955 A | * | 4/1988 | Connor .............. | B60J 3/0265 16/332 |

(Continued)

FOREIGN PATENT DOCUMENTS

| CN | 201 998 856 U | 10/2011 |
|---|---|---|
| CN | 102 762 131 A | 10/2012 |

(Continued)

*Primary Examiner* — Jose V Chen
(74) *Attorney, Agent, or Firm* — McGlew and Tuttle, P.C.

(57) ABSTRACT

A fold-out component body (1), in particular an armrest of a vehicle seat, can be rotated about an axis of rotation (4) from a stowage position (9) into a usage position (10). In the event of an accident, the fold-out component (1) can be secured in the stowage position thereof by a locking element (2).

20 Claims, 2 Drawing Sheets

(56) References Cited

U.S. PATENT DOCUMENTS

| | | | | |
|---|---|---|---|---|
| 5,342,115 A * | 8/1994 | De Filippo | | B60N 2/753 297/411.32 |
| 5,476,307 A * | 12/1995 | Whalen | | B60N 2/753 297/378.11 |
| 5,658,043 A * | 8/1997 | Davidson | | B60N 2/753 297/113 |
| 6,349,449 B1 * | 2/2002 | Kuehl | | E05D 11/084 16/332 |
| 6,375,265 B1 * | 4/2002 | Hubner | | B60N 2/767 297/411.32 |
| 8,777,317 B2 * | 7/2014 | Saito | | B60N 2/767 297/411.32 |
| 9,751,436 B2 * | 9/2017 | Hessdorfer | | B60N 2/4606 |
| 2002/0096928 A1 * | 7/2002 | Bidare | | B60N 2/767 297/411.32 |
| 2006/0061189 A1 * | 3/2006 | Yamane | | B60N 2/767 297/411.32 |
| 2006/0273647 A1 * | 12/2006 | Omori | | B60N 2/767 297/411.32 |
| 2008/0303335 A1 * | 12/2008 | van de Ven | | B60N 2/767 297/411.34 |
| 2009/0309407 A1 * | 12/2009 | Saito | | A47C 7/543 297/411.32 |
| 2016/0052429 A1 * | 2/2016 | Hessdorfer | | B60N 2/4606 297/411.32 |

FOREIGN PATENT DOCUMENTS

| | | |
|---|---|---|
| DE | 34 14 316 C2 | 5/1988 |
| DE | 37 05 770 A1 | 9/1988 |
| DE | 40 35 856 A1 | 5/1992 |
| DE | 40 35 856 C2 | 8/1992 |
| DE | 100 52 838 A1 | 5/2002 |
| DE | 10 2008 030 160 A1 | 9/2009 |
| DE | 201 998 856 U | 10/2011 |

* cited by examiner

SECURED FOLD-OUT COMPONENT OR SECURED ARMREST

CROSS REFERENCE TO RELATED APPLICATIONS

This application is a United States National Phase Application of International Application PCT/EP2015/068110 filed Aug. 5, 2015, and claims the benefit of priority under 35 U.S.C. § 119 of German Application 10 2014 215 432.4 filed Aug. 5, 2014, the entire contents of which are incorporated herein by reference.

FIELD OF THE INVENTION

The present invention relates to a fold-out component, in particular an armrest of a vehicle seat, which is rotatable about an axis of rotation from a stowage position into a use position and which is securable in its stowage position by a locking element in the event of an accident.

BACKGROUND OF THE INVENTION

Fold-out components of this type, such as, for example, armrests, are known from the prior art, for example from DE 40 35 856 C2 or DE 34 14 316 C2. However, the securing mechanisms described there are of comparatively complicated design.

SUMMARY OF THE INVENTION

It is therefore an object of the present invention to provide a fold-out component, such as, for example, an armrest, which does not have the disadvantages of the prior art.

The object is achieved with a fold-out component, in particular with an armrest of a vehicle seat, which is rotatable about an axis of rotation from a stowage position into a use position and which is securable in its stowage position by a locking element in the event of an accident, wherein, in the event of an accident, the locking element rotates about an axis of rotation from an actuating position into a locking position, wherein a cam disk is provided on the fold-out component or the armrest.

The present invention relates to the fold-out component. For example, such a fold-out component is the armrest of a vehicle seat, that is used in particular in the rear, i.e. on the rear bench of a motor vehicle. This armrest is rotatable about an axis of rotation from a stowage position, in which it is provided substantially parallel to the backrest of the vehicle seat, into a use position in which it is substantially oriented at a 90° angle to the backrest and is available to a seat occupant for the support of an arm. In order to avoid that the armrest in particular when it is in its stowage position, rotates and/or swings in an uncontrolled manner about its axis of rotation in the event of an accident, the armrest has, according to the invention, a locking element which secures the armrest in its stowage position.

According to the invention, the locking element is now provided in such a manner that, in the event of an accident, said locking element rotates about an axis of rotation from an actuating position, in which the armrest can be transferred freely about an axis of rotation from the stowage position into the use position and vice versa, into a locking position in which the armrest is retained in the stowage position. In particular, the fold-out component and the locking element are designed in such a manner that an angle of rotation of the locking element advances faster by a factor of 2 than an angle of rotation of the fold-out component in the event of an accident. This advantageously results in the provision of a locking mechanism for the fold-out component that is robust against timing changes in the system. The locking mechanism is preferably already locked in a few ms and maintains the locked state for a long period of time. The locking mechanism is preferably continuously locked from 25 ms and up to 180 ms. By this means, in particular interfering variables, such as cushion pressure, friction, positional errors, tolerances, weight differences, are reduced in their influence. Therefore, for example, the design can be transferred to further vehicle mechanisms. In addition, a redesign of the locking geometries which are moreover sensitive and are designed in detail is therefore obviated. The risk to the occupant is therefore reduced in an advantageous manner. Furthermore, the fold-out component according to the invention has a positive effect with regard to Buzz, Squeak and Rattle (BSR) properties since the spring-loaded pawl of conventional systems is omitted and, with this omission, the potential for rattling in the event of increasing stimulation is reduced.

In particular, a fold-out component according to the invention with the locking element is also provided in a lock, in a recliner, in a rail, in a lever, in a drawer and in any type of lock with centrifugal forces, in particular in centrifugal locks.

The cam disk is preferably substantially configured with an outer contour as a circle.

The axis of rotation of the fold-out component or the armrest and the axis of rotation of the cam disk preferably coincide.

The cam disk can be formed in a single piece or in multiple pieces with the armrest. However, in each case, the cam disk is provided for conjoint rotation with the armrest.

According to a preferred embodiment of the present invention, the cam disk and/or the fold-out component or the armrest have a locking contour, for example a recess, on its/their circumference. The armrest is secured in its stowage position by said locking contour in the event of an accident.

Furthermore preferably, the cam disk and/or the fold-out component or the armrest have a stop, in particular a stop notch, which limits the angle of rotation of the armrest, in particular in its use position.

The locking element is preferably provided in the form of a cam disk and particularly preferably has a circular cross section.

A recess is preferably provided on the circumference of the locking element, in particular on the circular cross section of the cam disk, said recess normally facing the cam disk of the fold-out component or the armrest and thereby permitting a rotation of the fold-out component or of the armrest from the use position into the stowage position and vice versa.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated. These explanations are merely by way of example and do not restrict the general inventive concepts.

DESCRIPTION OF THE PREFERRED EMBODIMENTS

Figure 1:
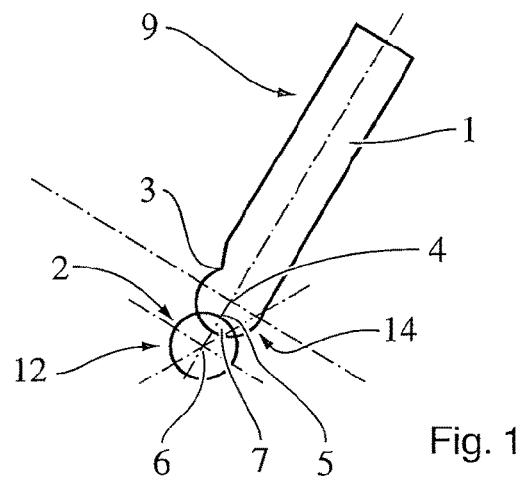
FIG. 1 is a schematic view of the fold-out component according to the invention in its stowage position or the armrest according to the invention in its stowage position.

Referring to the drawings, FIG. 1 shows the fold-out component with a component 1 according to the invention, such as, for example, an armrest 1 according to the invention which is provided on a vehicle seat. This vehicle seat is in particular a seat bench which is provided in particular in the rear of a vehicle seat. The fold-out component 1 according to the invention, such as, for example, the armrest 1 according to the invention, is then integrated between two vehicle seats, in particular into the backrest of the seat bench. In the illustration according to FIG. 1, the backrest is provided in its stowage position, i.e. it is located substantially parallel to the backrest (not illustrated) of the vehicle seat. The fold-out component 1 according to the invention or the armrest 1 according to the invention has an axis of rotation 4 about which the component body or armrest can be rotated from the stowage position 9 into its use position 10 (cf. FIG. 2). Furthermore, the fold-out component 1 or the armrest 1 has a cam disk 14 at a lower end in a region of the axis of rotation 4. The cam disk 14 can be provided in a single piece or in multiple pieces with the fold-out component 1 or the armrest 1, that is provided however for conjoint rotation with the fold-out component 1 or the armrest 1. In the present case, the cam disk 14 is the segment, preferably the ¾ segment of a circle and has a locking contour 5, here a recess, in the region of its circumference. Furthermore, the fold-out component 1 or the armrest 1 and/or the cam disk preferably has a stop 3, in particular a stop notch, which, as can be gathered from FIG. 2, limits the position of the fold-out component 1 or the armrest 1 in its use position, i.e. the angle of rotation of the fold-out component or of the armrest. Furthermore according to the invention, the fold-out component 1 or the armrest 1 has a locking element 2 which has a substantially circular cross section and which can be rotated from its actuating position 12 illustrated in FIG. 1 into a locking position 13 (cf. FIG. 3) in the event of an accident. The locking element has a recess 7. Rotation of the fold-out component 1 or of the armrest 1 from the stowage position into the use position is possible because of the recess 7.

Figure 2:
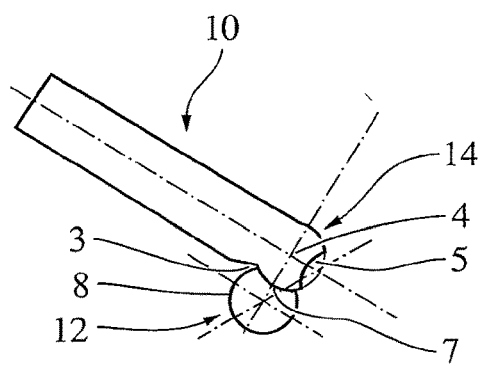
FIG. 2 is a schematic view of the fold-out component according to the invention in its use position or the armrest according to the invention in its use position.

FIG. 2 shows the fold-out component 1 according to the invention or the armrest 1 according to the invention in its use position. A comparison between FIGS. 1 and 2 shows that the cam disk 14 of the fold-out component 1 or of the armrest 1 rotates along a circular recess 7 until the stop 3 of the fold-out component 1 or of the armrest 1 strikes against the cam disk 2. The locking element 2 is consequently also a limiting element for the rotation of the fold-out component 1 or of the armrest 1.

Figure 3:
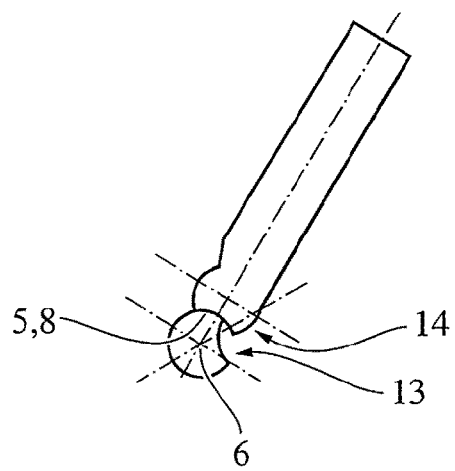
FIG. 3 is a schematic view of the stowed, secured fold-out component or the stowed, secured armrest in an accident situation.

FIG. 3 illustrates an accident situation in which decelerations going beyond the customary operation of a motor vehicle take place. Such a deceleration causes the locking element 2 to be brought about its axis of rotation, here in the clockwise direction, from the actuating position 12 illustrated in FIGS. 1 and 2 into a locking position 13. As a result, the locking element 2 engages in a locking contour 5 provided on the cam disk 14 or the fold-out component 1 or the armrest 1, here a recess in the cam disk 14, and thereby prevents the fold-out component 1 or the armrest 1 from being able to rotate about its axis of rotation 4. The rotation of the locking element 2 can be brought about by the deceleration and/or a drive.

As soon as the accident situation is past, the cam disk 14 can be brought again into its actuating position 12, and therefore normal actuation of the fold-out component 1 or of the armrest 1 is possible.

Figure 4:
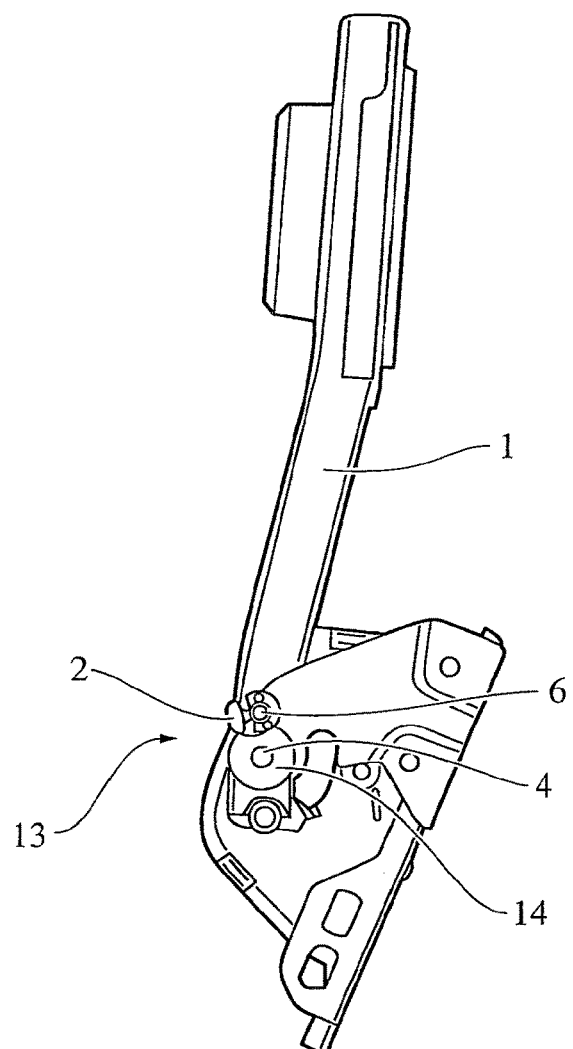
FIG. 4 is a side view of a further embodiment of the fold-out component according to the invention or of the armrest according to the invention in a locking position.
Figure 5:
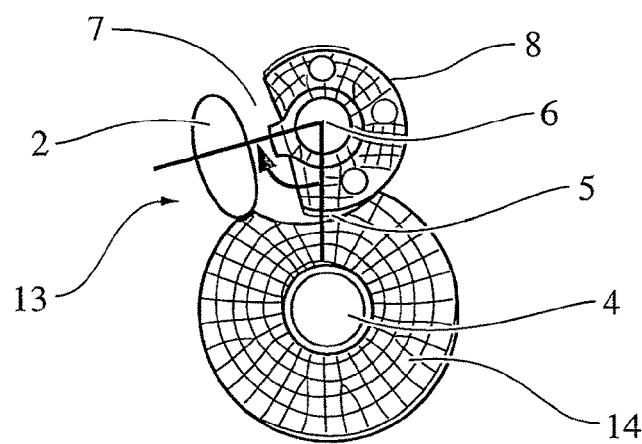
FIG. 5 is a detailed view of the further embodiment according to FIG. 4.

FIG. 4 and FIG. 5 show a further embodiment of the fold-out component 1 according to the invention or of the armrest 1 according to the invention in a locking position. The locking element 2 is located here in the locking position 13 and engages in the locking contour 5 provided on the cam disk 14 (cf. FIG. 3), and therefore rotation of the fold-out component 1 or of the armrest 1 about its axis of rotation 4 in the counter clockwise direction in FIG. 4 and FIG. 5 is prevented.

While specific embodiments of the invention have been shown and described in detail to illustrate the application of the principles of the invention, it will be understood that the invention may be embodied otherwise without departing from such principles.

The invention claimed is:

1. A vehicle seat fold-out component, the fold out component comprising:
    a component or an armrest rotatable about an axis of rotation from a stowage position into a use position;
    a locking element, the component or the armrest being securable in the stowage position by the locking element in the event of an accident, wherein, in the event of an accident, the locking element rotates about an axis of rotation from an actuating position into a locking position, the locking element being provided in the form of a locking element cam disk
    a component or armrest cam disk provided on the component or the armrest.

2. The fold-out component as claimed in claim 1, wherein the axis of rotation of the component or the armrest coincides with an axis of rotation of the component or armrest cam disk.

3. The fold-out component as claimed in claim 2, wherein the component or armrest cam disk and/or the component or the armrest has a locking contour comprising a recess, on a circumference of the component or armrest cam disk and/or the component or the armrest.

4. The fold-out component as claimed in claim 2, wherein the component or armrest cam disk and/or the component or the armrest has a stop comprising a stop notch.

5. The fold-out component as claimed in claim 1, wherein the second cam disk and/or the component or the armrest has a locking contour comprising a recess, on a circumference of the component or armrest cam disk and/or the component or the armrest.

6. The fold-out component as claimed in claim 1, wherein the component or armrest cam disk and/or the component or the armrest has a stop comprising a stop notch.

7. The fold-out component as claimed in claim 1, wherein the locking element has a circular cross section.

8. The fold-out component as claimed in claim 7, wherein the locking element cam disk has a recess on a locking element circumference.

9. The fold-out component as claimed in claim 1, wherein the locking element has a recess on a locking element circumference.

10. A vehicle seat fold-out component, the fold out component comprising:
   a component or an armrest rotatable about an axis of rotation from a stowage position into a use position;
   a first cam disk, the component or the armrest being securable in the stowage position by the first cam disk in the event of an accident; and
   a second cam disk provided on the component or the armrest, wherein, in the event of an accident, the first cam disk rotates about an axis of rotation from an actuating position into a locking position, wherein the first cam is rotatable independent of movement of the second cam disk.

11. The fold-out component as claimed in claim 1, wherein the first cam disk has a circular cross section.

12. The fold-out component as claimed in claim 11, wherein the first cam disk has a recess on a locking element circumference.

13. The fold-out component as claimed in claim 10, wherein the first cam disk element has a recess on a locking element circumference.

14. The fold-out component as claimed in claim 10, wherein the first cam disk element has a recess on a locking element circumference, at least a portion of the second cam disk being arranged in the recess when the first cam disk is in the use position.

15. The fold-out component as claimed in claim 10, wherein the first cam disk comprises a first cam disk circumferential portion extending in a circumferential direction with respect to the axis of rotation of the first cam disk, the first cam disk circumferential portion being in contact with the second cam disk when the first cam disk is in at least the locking position.

16. A vehicle seat fold-out component, the fold out component comprising:
   a component or an armrest rotatable about an axis of rotation from a stowage position into a use position;
   a first cam disk, the component or the armrest being securable in the stowage position by the first cam disk in the event of an accident; and
   a second cam disk provided on the component or the armrest, wherein, in the event of an accident, the first cam disk rotates about an axis of rotation from an actuating position into a locking position.

17. The fold-out component as claimed in claim 16, wherein the first cam disk element has a recess on a locking element circumference.

18. The fold-out component as claimed in claim 16, wherein the first cam disk element has a recess on a locking element circumference, at least a portion of the second cam disk being arranged in the recess when the first cam disk is in the actuating position.

19. The fold-out component as claimed in claim 16, wherein the first cam disk comprises a first cam disk circumferential portion extending in a circumferential direction with respect to the axis of rotation of the first cam disk, the first cam disk circumferential portion being in contact with the second cam disk when the first cam disk is in the locking position.

20. The fold-out component as claimed in claim 16, wherein the first cam disk has a circular cross section, the first cam disk having a recess on a locking element circumference.

* * * * *